Nov. 3, 1959 A. SABATINO ET AL 2,911,457
METHOD AND APPARATUS FOR MAKING DRY CHARGED BATTERIES
Filed March 29, 1955 2 Sheets-Sheet 1
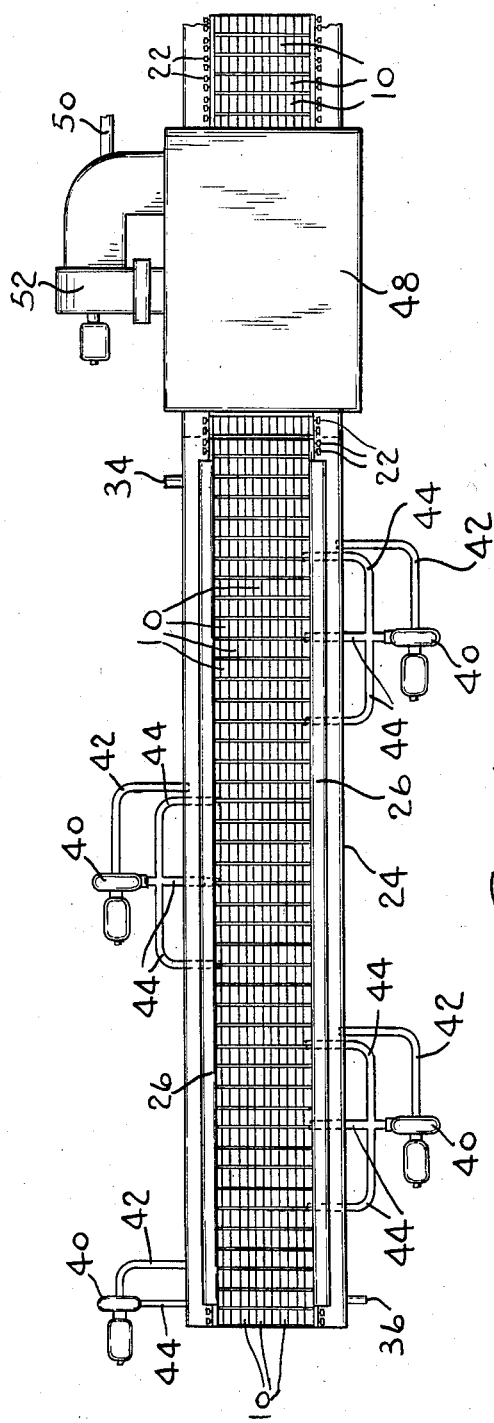
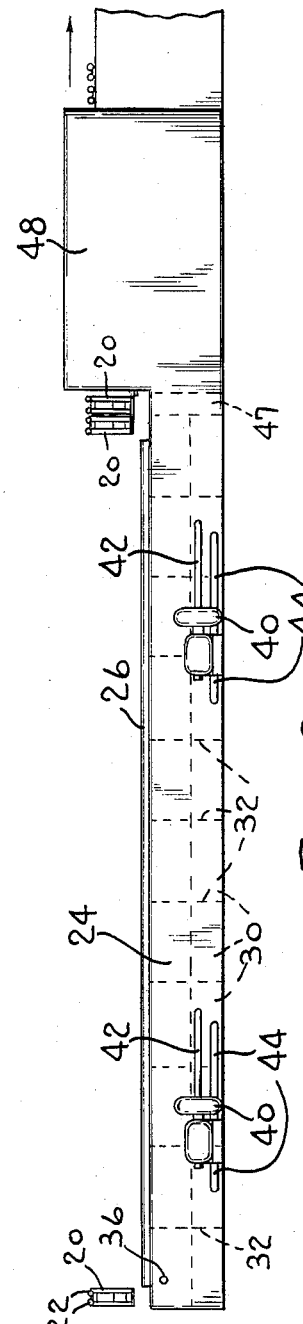
INVENTOR.
ANTHONY SABATINO
BY JOHN F. SCHAEFER
John W. Michael
ATTORNEY

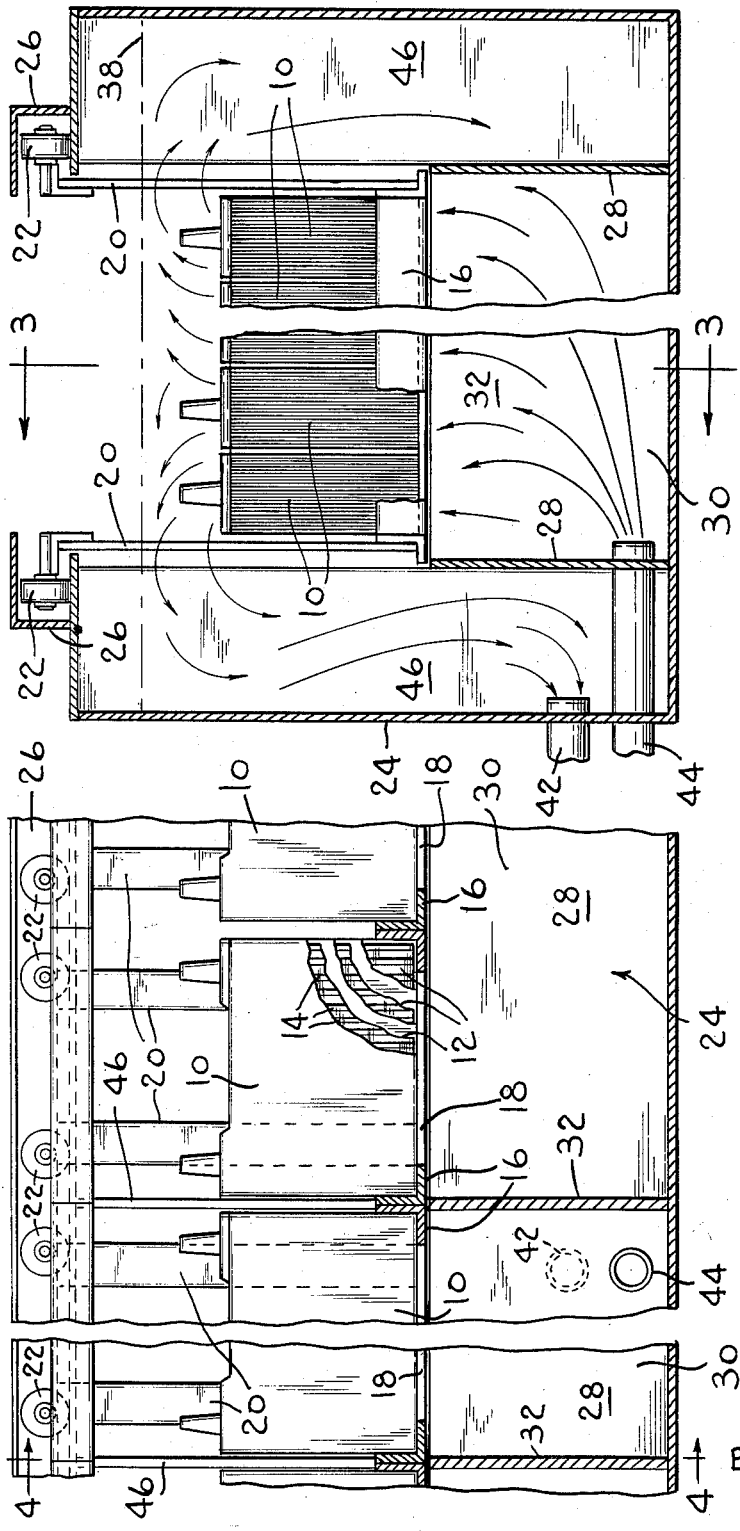

United States Patent Office 2,911,457
Patented Nov. 3, 1959

2,911,457
METHOD AND APPARATUS FOR MAKING DRY CHARGED BATTERIES

Anthony Sabatino, Milwaukee, and John F. Schaefer, Granville, Wis., assignors to Globe-Union Inc., Milwaukee, Wis., a corporation of Delaware Application March 29, 1955, Serial No. 497,777

4 Claims. (Cl. 136—33)

This invention relates to improvements in the process and apparatus for preparing charged storage battery cell assemblies for preservation in dry state.

It is well known to those skilled in the art that in the dry charge procedure the charged battery cell assembly consisting of negative plates connected by a strap to form a negative group, positive plates connected by a strap to form a positive group with the plates of said groups meshed and spaced by separators are removed from the electrolyte, separated or unmeshed under water into positive groups and negative groups which are each then separately washed and dried. Then negative and positive groups are reassembled or remeshed with dried unused separators and inserted in battery cases. The separators used in the formation were inspected and reused in the formation (charging) of other cell assemblies. Such repeated assembly and disassembly unduly prolongs the manufacturing procedure and leads to loss by breakage of the separators and possible oxidation of the negative groups.

Throughout this specification and appended claims: "cell assembly" shall mean a negative plate group with negative plates spaced and fixedly connected by a post strap, a positive plate group with positive plates spaced and fixedly connected by a post strap, the plates of the groups being alternately meshed in the manner customarily employed while in use in a battery cell, and separators placed between adjacent plates, the compressional engagement between said plates and separators being sufficient to hold said separators and the groups in place during handling of said cell assembly; and "charged battery cell assembly" or "charged cell assembly" shall mean a cell assembly which while immersed in battery electrolyte has had a charging current applied to the plates of the assembly to attain the electrochemical characteristics necessary to obtain a battery cell capable of functioning as a fully charged battery cell.

It is the object of this invention, therefore, to produce dry charge batteries without such prolonged procedure and its attendant losses and disadvantages.

This object is obtained by washing and drying the charged cell assembly. The washing is done while the cell assemblies are immersed in the wash water. Practically all of such water is forced under pressure between the plates and separators so that it flows through the space between the ribs on the separators. Some of such water is passed between the cell assemblies. The drying is done in an oven with heated low oxygen content air or inert atmosphere. The essential apparatus for such washing includes: an open bottom tray on which cell assemblies are placed so as to completely cover such opening, a baffled tank containing wash water in which the tray and cell assemblies are immersed to cooperate with the baffles and form an enclosed compartment connecting with the opening in the bottom of the tray; and water circulating means for forcing water in said compartment through said opening and in between the plates of said cell assemblies. The oven contains means for passing a blast of high velocity low oxygen content air heated to a range of 200° F. to 300° F. through and about the cell assemblies.

The novel features which are considered characteristic of the invention are set forth with particularity in the appended claims. The invention itself, however, both as to its organization and its method of operation together with additional objects and advantages thereof, will be best understood from the following description of specific embodiments, when read in connection with the accompanying drawings, in which:

Fig. 1 is a top plan view of apparatus by which the process of the present invention is carried out;

Fig. 2 is a view in side elevation of such apparatus;

Fig. 3 is an enlarged fragmentary longitudinal sectional view taken on the line 3—3 of Fig. 4 showing the washing tank, battery cell assemblies and supported trays as employed in such process; and Fig. 4 is an enlarged fragmentary transverse sectional view taken on the line 4—4 of Fig. 3.

As heretofore briefly described, the washing of the charged cell assembly takes place while immersed in wash water. While this can be accomplished in tanks in which the cell assemblies are stationary, additional saving of time and handling can be accomplished if the assemblies move through the tank and oven at regular intermittent steps. The apparatus herein described utilizes such intermittent advance.

Each previously charged cell assembly 10 (consisting of a group of negative plates connected by a post strap and a group of positive plates also connected by a post strap with adjacent negative and positive plates alternately meshed and spaced by standard separators 12 with ridges 14) is placed in a tray or rack 16 having an opening 18 in the bottom thereof substantially coextensive with the area of such bottom. It is advisable to load the tray while immersed in water by transferring each charged assembly from the forming electrolyte directly to the submerged tray. The tray at the furthermost left may be loaded while in the tank 24 or a previously loaded tray placed in such tank while the forward movement is stopped. Each tray is lengthwise dimensioned so that when a prescribed number of cell assemblies (say 12 for example) are placed in side to side engagement therein the tray will be completely filled and the opening 18 will be entirely covered by the cell assemblies. Each tray has vertically extending posts 20 having rollers 22 on the upper ends thereof adapted to guide the tray by rolling along a support.

A wash tank 24 approximately 20 feet long has roller supports and guides 26 along the edges of its top upon which the rollers 22 ride to support the trays within such tank for forward (to the right) advancement. A pair of longitudinally extending spaced baffles 28 on the bottom of the tank form a compartment 30 the top of which is open and coextensive with the bottom of the trays 16. At spaced intervals in the compartment 30 are transverse baffles 32 which form a series of chambers. These are in lengths equal to multiples of trays 16. In this embodiment they are spaced to hold four trays. When four full trays are spaced over a chamber the top of such chamber will be substantially closed thereby as the bottoms of the trays 16 are close enough to the tops of the baffles 28 and 32 to make the seal effective for the purpose herein described. Each tray 16 abuts against the preceding tray and to move all trays forward in the wash tank, it is only necessary to push the left-hand tray forward the distance of one tray. The mechanism for accomplishing this is well known, is not a part of this invention and, therefore, is not illustrated. It is also feasible to advance the trays at a continuous constant rate by well known conveyer drive means. In either case it has been found desirable to wash the cell assemblies for substantially two hours in order to thoroughly remove the forming electrolyte. The timing of the intermittent advances or the constant advance is correlated with the tank length to obtain such timing.

The washing is more effective, if done in stages in the several chambers with the fresh water entering at the tray discharge end (right) of the tank through an inlet 34 at a rate of about 40 gallons per minute. An overflow outlet 36 located at the entrance end (left) of the tank acts as a weir to maintain the wash water at the level indicated at 38. To accomplish such stage washing, water is pumped from the general part of the tank into each chamber. The only way most of such water (under pressure) can escape is out through the openings 18 and out in between the plates and separators of the cell assemblies 10. The channels formed between the ridges 14 direct and confine the wash water so that it travels completely from one end to the other of such groups. The cell assemblies being completely immersed in the wash water within the tank have their outer edges and sides washed by the circulation which takes place as the trays are advanced through the wash water. In order to pump the wash water into each chamber a number of recirculating motor driven water pumps 40 are employed. The pumps have intake pipes 42 connected to the tank outside of the baffles 28 and 32 and outlet pipes 44 connected to the chambers. In this embodiment the entrance end pump is connected only with one chamber and delivers approximately 40 gallons per minute. Each of the other three pumps have three outlets leading to three separate chambers and deliver substantially 120 gallons per minute or about 40 gallons per minute to each such chamber.

The stage washing may be made more efficient by placing vertical baffles 46 between the sides of the tank and the baffles 28. The vertical baffles extend to the top of the tank and break up the flow of wash water along the tank induced by forward movement of the trays and cell groups. In each successive chamber toward the discharge end the wash water contains less of the removed acid until substantially clear water is forced through the substantially acid-free cell groups in the final chamber. The low gravity acid used in the formation (charging) of the cell assembly is diluted and, as washed from the plates, flows with the wash water toward the entrance end (left) and out through the overflow outlet 36.

At the right hand of the tank 24, it is preferable to have a dipping tank 47 which contains a wetting agent such as dioctyl sodium sulfosuccinate (known in the trade as Aerosol OT) in which the cell assemblies are immersed for 10 minutes. This reduces the activation time following the filling of a dry charged battery with electrolyte to less than 5 minutes.

After all the acid has been removed from the plates, all traces of the water must be removed. This should be done without unduly exposing the negative plates to the air. Possibility of any damaging oxidation of the negative plates is eliminated by an immediate drying of the cell groups in low oxygen content air or inert atmosphere. This is accomplished by raising the two leading (right end) loaded trays out of the wash tank 24 until the rollers 22 are on the same level as the support running through the oven. The mechanism for raising the trays is of standard design and is not, therefore, disclosed. It is timed with the advancing mechanism so that such leading trays are raised before the advancing means moves the trays forward. As the raised trays reach proper level they will be advanced by gravity action or other means a one-tray distance. This will put the leading tray in the oven and the second tray over the dipping tank 47. The raising mechanism then lowers the second tray into the dipping tank and the advancing mechanism will move all the trays on the tank support 26 forward one-tray space. Hence, the raised trays are exposed only during the time they are being raised and lowered.

An oven 48 has a gas burner 50 and a motor driven blower 52 capable of moving 10,000 cubic feet of air per minute. The gas burns out the necessary amount of oxygen in the air at the same time raising its temperature to a range of 200° F. to 300° F. The high velocity blast of such heated low oxygen content air directed against and through the cell assemblies completely drying the plates and separators substantially without oxidation of the negative plates. Instead of the products of combustion, heated inert gas, superheated steam or other like gaseous material free of harmful oxidizing material may be used. The size of the oven is correlated to the speed of advancement so that the cell assemblies are dried in about 45 minutes. After drying the cell assemblies are placed in battery containers and stored dry until needed for use. When use is required, the regular electrolyte or acid is added and the charged battery is immediately available.

Although only several embodiments of the invention are described herein, it will be understood that this application is intended to cover such other changes or modifications as come within the spirit of the invention or scope of the following claims.

We claim:

1. The method of treating a charged battery cell assembly comprising washing said cell assembly by immersing the same in a body of wash water and forcing the water under pressure between the plates and separators of said assembly to remove the forming electrolyte, and then drying said cell assembly to evaporate said wash water and prevent oxidation of the negative plates of said cell assembly, by forcing between the plates and separators of said assembly, immediately after washing, a confined stream of heated, low oxygen-content air.

2. The method as claimed in claim 1 in which said washing takes place in successive stages within a wash tank.

3. The method as claimed in claim 1 in which said water is forced through said cell assembly for substantially two hours.

4. The process described in claim 1 wherein the battery cell assembly after washing and before drying is immersed in a body of a wetting agent.

References Cited in the file of this patent

UNITED STATES PATENTS

| | | |
|---|---|---|
| 1,439,994 | Benner | Dec. 26, 1922 |
| 1,799,248 | Reinhardt | Apr. 7, 1931 |
| 1,806,180 | Reinhardt | May 19, 1931 |
| 1,982,095 | Goodrich | Nov. 27, 1934 |
| 2,149,812 | Lindstrom | Mar. 7, 1939 |
| 2,389,893 | Chubb et al. | Nov. 27, 1945 |
| 2,389,894 | Chubb et al. | Nov. 27, 1945 |
| 2,681,377 | Smithers | June 15, 1954 |
| 2,683,183 | Hole | July 6, 1954 |
| 2,724,734 | Howard | Nov. 22, 1955 |
| 2,747,008 | Sundberg et al. | May 22, 1956 |
| 2,794,753 | Duddy | June 4, 1957 |

FOREIGN PATENTS

| | | |
|---|---|---|
| 210,750 | Germany | Sept. 10, 1908 |